July 3, 1934.  L. G. LANGE  1,965,196
METHOD AND APPARATUS FOR CANCELING MOTION PICTURE FILM
Filed Jan. 22, 1932
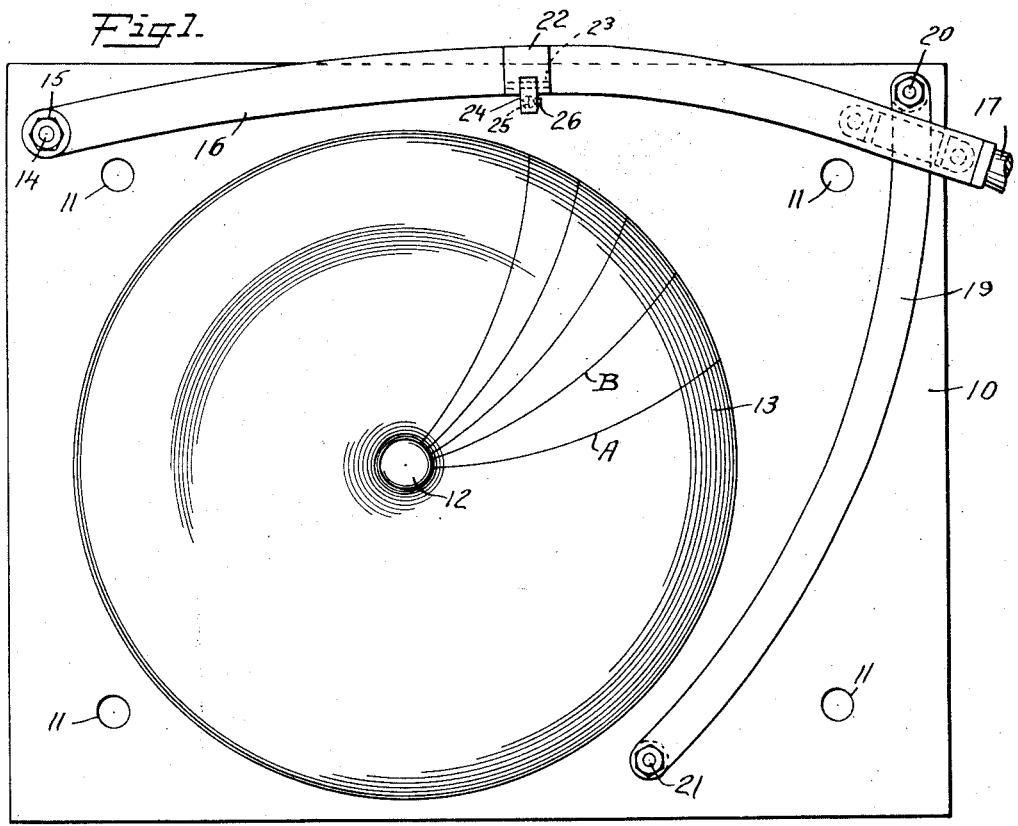
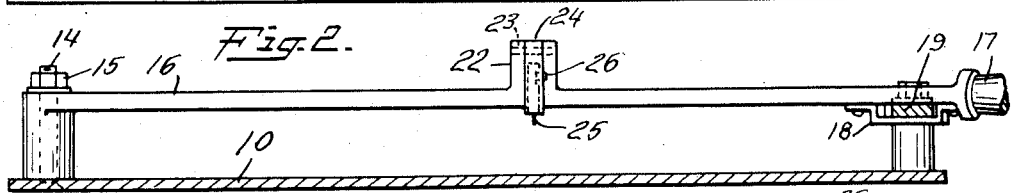
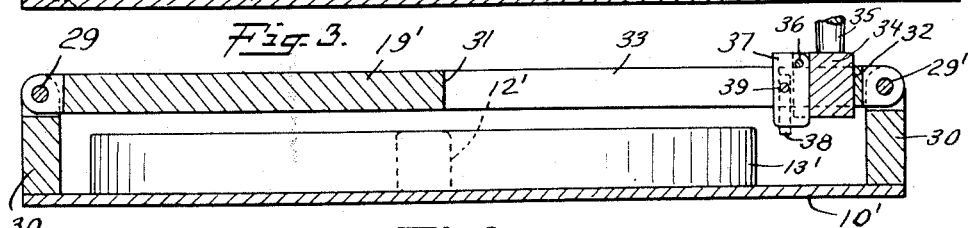
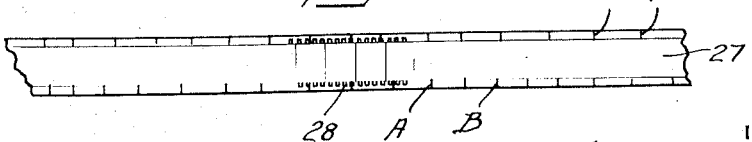
INVENTOR
Louvern G. Lange
BY
Pennie, Davis, Marvin, Edmonds
ATTORNEYS Patented July 3, 1934

1,965,196

UNITED STATES PATENT OFFICE 1,965,196

METHOD AND APPARATUS FOR CANCELING MOTION PICTURE FILM

Louvern G. Lange, Passaic, N. J.

Application January 22, 1932, Serial No. 588,148

11 Claims. (Cl. 164—17)

This invention relates to the cancellation of motion picture film after its period of usefulness has passed, so that it cannot be used again. The materials from which motion picture film is made are recoverable and may be used again, so that the old films are useful for this purpose and are therefore not destroyed. As the old films are returned from the various theatres or other places where they have been shown, and have become damaged, obsolete, or are not to be used again for other reasons, they are accumulated for recovery of the materials from which they were originally made. Many of these old films are still in good condition for further use, and, despite precautions, they are frequently stolen or otherwise obtained in an unauthorized manner and are marketed, leased, or otherwise used without permission from the original owners or lessors. This objectionable state of affairs can be prevented by canceling the film so that it cannot be used again, but it is important that this cancellation must not destroy the film materials or prevent their reclamation, and it is also desirable that this cancellation process be carried out with little expense or labor.

It is accordingly the principal object of this invention to provide a method and apparatus for easily and effectively canceling old or obsolete motion picture film, so that it cannot be used again and in such a way that the film materials are not destroyed or otherwise injured to prevent their recovery.

This object is obtained by mutilating the traction slots at the edge of the film so that the cog wheels of the projector will no longer drive the film smoothly and steadily, as is necessary for procuring the proper projection of the film scenes upon the screen. This mutilation of the traction slots of the film is effected by scoring or cutting a roll of the film along one or both of the flat sides thereof, which results in the mutilation of the traction edge or edges of the film in the manner described. To avoid tearing the unsupported convolutions of the film adjacent the outer periphery of the roll, the scoring or cutting action is carried on from the periphery toward the center of the film roll and preferably in a substantially radial direction.

The apparatus for performing the film canceling method described comprises a base for holding the roll of film flatwise and a peg on which the film roll is adapted to be rotated on the base. A knife blade, carried on a guide connected to the base, is arranged to be moved across the flat side of the film roll to score or cut the edge of the rolled film in the manner described. The knife is pivoted so that it will only cut when moved from the periphery toward the center of the film roll and will tilt and drag ineffectively when moved in the opposite direction, whereby tearing or breaking of the unsupported peripheral convolutions of the film roll is prevented.

It will be seen that this method and apparatus for canceling motion picture film by rendering it ineffective for further use is very effective, simple, inexpensive and safe, in that it mutilates the film without destroying it or affecting the ready recovery of the film materials.

For a better understanding of the invention, reference may be made to the accompanying drawing, in which Figure 1 is a plan view of the new film canceling apparatus of this invention;

Fig. 2 is a cross-section therethrough;

Fig. 3 is a cross-section through a modified form of the apparatus, and

Fig. 4 illustrates a length of film which has been mutilated by the apparatus of the preceding figures of the drawing in accordance with the method of this invention.

In Figs. 1 and 2 of the drawing numeral 10 designates a base plate of metal having holes 11 for the reception of screws or bolts for securing the base plate 10 to a suitable support, such as a table. Adjacent the center of the base plate 10 is a vertical peg 12 adapted to receive the center opening of a roll of motion picture film 13, this roll 13 being rotatable flatwise about the peg 12 relatively to the base plate 10.

Journalled on a pin 14 secured to one corner of the base plate 10 and locked in place thereon by the nut 15 is a curved arm 16 having a handle 17 at its free end. A U-shaped cleat 18 secured near the handle 17 of the bar 16 embraces a curved guide 19, whose center of curvature is the pivot pin 14 of the bar 16. This guide 19 is secured to the base plate 10 by the bolts or studs 20 and 21. As the bar 16 is moved about its pivot 14 the guide 19 holds it in properly spaced relation to the base plate 10 and the flat upper surface of the film roll 13. The cleat 18 holds the bar 16 on the guide 19 and confines its pivotal movement to the length of the guide 19.

Mounted upon or formed integrally with the bar 16 is a lug 22 which has a slot on the inner side as seen in Figs. 1 and 2. Pivoted in this slot on a pin 23 is the knife blade holder 24 carrying the knife blade 25 which is adjustable in the knife blade holder 24. A set screw 26 locks the knife blade 25 on the holder in any adjusted position. The knife blade holder 24 is spaced approximately the same distance from the pivot pin 14 as is the peg 12 and is so arranged in the lug 22 that it is braced against movement about its pivot pin 23 when the bar 16 is moved in a clockwise direction as seen in Fig. 1, but is free to tilt about its pivot 23 when the bar 16 is moved in a counter-clockwise direction and the back edge of the knife blade 25 is drawn over a surface such as the flat surface of the film 13.

In operating this apparatus, the roll of film 13 is placed flatwise on the base plate 10 around the peg 12. Then the operator grasps the handle 17 of the bar 16 and moves the latter about its pivot 14 and along guide 19 in a clockwise direction. The knife blade 25, being aligned with the peg 12 and braced in the lug 22 for cutting action, scores or cuts the flat surface of the roll of film 13 from the periphery thereof to the peg 12, forming the score or knife cut A. When the operator has moved the knife blade 25 to or adjacent the peg 12 he withdraws or reverses the movement of the bar 16 in a counter-clockwise direction, whereby the knife blade 25 drags ineffectively over the surface of the film roll 13, since the knife blade holder 24 tilts about the pivot pin 23. The knife blade accordingly only cuts from the periphery toward the center of the roll, i. e. from the loose peripheral convolutions to the compact center thereof and as the back or dull edge of the knife blade drags over the surface of the roll on the reverse movement, it does not catch in and thus tear or split the looser peripheral convolutions. The operator then gives the roll of film 13 a partial turn about peg 12 as an axis and repeats the operation, producing the second score or knife cut B on the surface of the roll of film 13. This process is repeated until the entire flat surface of the film roll 13 has been scored in the manner indicated in Fig. 1. The film roll 13 may then be reversed and its other flat surface scored in the same manner.

The effect of this scoring of the flat surface of the film roll 13 is shown graphically in Fig. 4 which represents a length 27 of the film of the film roll 13. The knife cuts A and B in this length of film 27 are seen to pass through the traction edge and in most cases they pierce the traction slots 28 of the film, so that these traction slots are mutilated and will no longer cooperate accurately with the driving cog wheels of the projecting machine. By adjusting the knife blade 25 in the knife blade holder 24 and locking it in place with set screw 26, the depth of the knife cuts A and B may be varied to suit requirements.

A modified form of the apparatus of this invention is illustrated in section in Fig. 3. In this arrangement the film roll 13' is mounted over the peg 12' of base plate 10' and the guide bar 19' is secured at each end on the studs 30 by the pins 29 and 29' and the ends of the studs 30 are forked for the reception of the reduced ends of the guide bar 19'. One of the securing pins is made removable, preferably the right hand one 29', so that the guide bar 19' may be lifted about the other pin 29 as a pivot to enable the operator to place the film roll 13' on and remove it from the base plate 10'. The guide bar 19' is provided with a slot 33 extending outwardly from the peg 12' and the ends of the slot form the abutments 31 and 32 on the guide bar 19'. Slidably mounted in this slot 33 on the guide bar 19' and freely movable thereon between the abutments 31 and 32, is a slider 34 having a handle 35. Pivoted by pin 36 to this slider 34 is a knife blade holder 37 carrying the knife blade 38 which is adjustable in the holder 37 and is secured in adjusted position by the set screw 39. The knife blade holder 37 is free to tilt to the left about pin 36, but is braced by the slide 34 against movement in the opposite direction. The lower corners or edges of the tiltable knife blade holder 37, as well as the corresponding corners or edges of the knife blade holder 24 in the arrangement of Fig. 1, are rounded to prevent obstructon of the movements of the holder by engagement with the surface of the film roll. Thus only the knife blade engages the film roll.

In order to operate the modified apparatus of Fig. 3, the operator removes pin 29', lifts the guide bar 19' about the other pin 29, places film roll 13' upon peg 12', returns guide bar 19' to its normal position and locks it in place by replacing pin 29. This guide bar 19' extends substantially diametrically across the film roll 13'. The operator then grasps handle 35 and moves slider 34 inwardly toward the peg 12'. The knife blade 38 will score or cut the flat upper surface of the film roll 13' in the manner described and on the return movement of the slider 34 the knife blade holder 37 will tilt as the back edge of the knife blade 38 is dragged back along the surface of the film roll 13', so that the knife blade 38 is ineffective and does not cut. By rotating the film roll 13' through a small angle about its peg 12' and repeating the operation until the entire surface of the film roll 13' is scored or cut, the film will resemble the length of canceled film illustrated in Fig. 4.

It will be seen that the method of and apparatus for canceling the motion picture is very simple and effective in that it cancels the film simply by mutilating the traction edges thereof without destroying or otherwise impairing the materials from which it was originally made, so that they may be recovered substantially in their entirety. By arranging the knife blade holders 24 and 37 in such a way that the corresponding knives 25 and 38 only cut or score the film roll when the knife is moved from the periphery toward the center of the film roll, tearing or splitting of the outer convolutions of the film roll is prevented and a firmer cutting action is secured, since the knife moves toward the denser inner convolutions of the film roll during the cutting operation.

While a preferred embodiment of the invention has been described herein it is to be understood that it is not limited thereby but is susceptible of changes in form and detail within its scope.

I claim:

1. The method of canceling motion picture film which comprises arranging it in superposed layers and cutting at least one edge of the layer arrangement.

2. The method of canceling motion picture film which comprises scoring at least one edge thereof while it is in rolled form.

3. The method of canceling motion picture film which comprises scoring the side of a roll thereof.

4. The method of canceling motion picture film which comprises cutting the side of a roll thereof by a plurality of substantially radial knife cuts.

5. The method of canceling motion picture film which comprises cutting the side of a roll thereof from the periphery inwardly toward the center thereof.

6. In apparatus for canceling motion picture film, the combination of a base for holding a roll of the film flatwise, a knife for scoring the flat surface of the roll to mutilate the edge of the film, and a support on the base for the knife confining its cutting movement radially of the roll of film.

7. In apparatus for canceling motion picture film, the combination of a base for holding a roll of the film flatwise, a knife movable over the flat surface of the roll for mutilating the edge of the film, and a bar on the base pivotally mounting the knife for cutting movement in only one direction.

8. In apparatus for canceling motion picture film, the combination of a base for holding a roll of the film flatwise, a knife movable over the flat surface of the roll of film to mutilate the edge of the film, and a bar pivotally mounting the knife for cutting movement only substantially radially inwardly from the periphery of the roll.

9. In apparatus for canceling motion picture film, the combination of a base for holding a roll of the film flatwise, a knife bar movable over the flat surface of the roll of film, and a knife pivotally mounted on the bar for movement about its pivot in a direction opposite to its cutting movement, thereby permitting the knife to cut only when moved in one direction over the roll of film.

10. In apparatus for canceling motion picture film, the combination of a base for holding a roll of the film flatwise, a carrier mounted on the base and movable over the flat surface of the roll of film, and a knife pivoted on the carrier for movement relatively to the carrier to non-cutting position when the latter is moved in one direction over the roll of film and which is locked in cutting position on the carrier when the latter is moved in the opposite direction.

11. In apparatus for canceling motion picture film, the combination of a base for holding a roll of the film flatwise, a bar extending substantially radially over the flat surface of the roll of film, and a pivoted knife movable along said bar for scoring the flat surface of the film substantially radially when moved in one direction.

LOUVERN G. LANGE.